United States Patent
Decarreau et al.

(10) Patent No.: US 9,706,418 B2
(45) Date of Patent: Jul. 11, 2017

(54) RETRANSMISSION OF PROTOCOL DATA UNIT VIA ALTERNATE TRANSMISSION PATH FOR DUAL CONNECTIVITY WIRELESS NETWORK

(71) Applicant: NOKIA SOLUTIONS AND NETWORKS OY, Espoo (FI)

(72) Inventors: Guillaume Decarreau, Munich (DE); Benoist Pierre Sebire, Tokyo (JP); Chunli Wu, Beijing (CN); Henri Markus Koskinen, Espoo (FI)

(73) Assignee: Nokia Solutions And Networks OY, Espoo (FI)

( * ) Notice: Subject to any disclaimer, the term of this patent is extended or adjusted under 35 U.S.C. 154(b) by 16 days.

(21) Appl. No.: 14/909,334

(22) PCT Filed: Jan. 31, 2014

(86) PCT No.: PCT/EP2014/051932
§ 371 (c)(1),
(2) Date: Feb. 1, 2016

(87) PCT Pub. No.: WO2015/018535
PCT Pub. Date: Feb. 12, 2015

(65) Prior Publication Data
US 2016/0183158 A1    Jun. 23, 2016

(30) Foreign Application Priority Data
Aug. 9, 2013   (WO) ................. PCT/EP2013/066676

(51) Int. Cl.
*H04W 24/02*    (2009.01)
*H04W 36/02*    (2009.01)
(Continued)

(52) U.S. Cl.
CPC .......... *H04W 24/02* (2013.01); *H04L 1/1877* (2013.01); *H04W 24/04* (2013.01);
(Continued)

(58) Field of Classification Search
None
See application file for complete search history.

(56) References Cited

U.S. PATENT DOCUMENTS 8,411,652 B2    4/2013  Hans et al.
2010/0118781 A1*  5/2010  Petrovic ................ H04L 1/1887
                                                370/328
(Continued)

FOREIGN PATENT DOCUMENTS

WO    2011100492 A1    8/2011
WO    2012064772 A1    5/2012

OTHER PUBLICATIONS

Broadcom Corporation et al: "Physical Channel establishment and Radio Link Failure on the secondary uplink frequency", 2-132140 XP050700254, Retrieved from the Internet: URL:http://www.3gpp.org/ftp/tsg ran/WG2 RL2/TSGR2_82/Docs/ [retrieved on May 24, 2013] paragraphs [8.5.4B], [8.5.6A], [13.1] 3GPP TSG-RAN WG2 Meeting #82 Fukuoka, Japan, May 20-24, 2013.
(Continued)

*Primary Examiner* — Andrew Oh
(74) *Attorney, Agent, or Firm* — Brake Hughes Bellermann LLP (57) ABSTRACT

A technique is provided for retransmitting data in a dual connectivity network in which a mobile station (MS) is connected to a first base station (BS) via a first radio link and to a second BS via a second radio link, including sending, by a first protocol entity of the MS, a protocol data unit (PDU) to a first entity of a second protocol of the MS for transmission to the first BS via the first radio link, detecting a
(Continued)

trigger condition at the MS associated with the PDU, and re-sending, by the first protocol entity of the MS, the PDU to a second entity of the second protocol of the MS for transmission to the second BS via the second radio link.

19 Claims, 6 Drawing Sheets (51) Int. Cl.
H04L 1/18 (2006.01)
H04W 24/04 (2009.01)
H04W 36/00 (2009.01)
H04W 40/02 (2009.01)
H04W 76/02 (2009.01)
H04L 1/16 (2006.01)

(52) U.S. Cl.
CPC ....... *H04W 36/0055* (2013.01); *H04W 36/02* (2013.01); *H04W 40/02* (2013.01); *H04L 1/1671* (2013.01); *H04W 76/025* (2013.01)

(56) References Cited

U.S. PATENT DOCUMENTS

| | | | |
|---|---|---|---|
| 2013/0188575 A1 | 7/2013 | Lee et al. | |
| 2014/0031040 A1* | 1/2014 | Lee | H04W 36/0005 455/437 |
| 2014/0135018 A1* | 5/2014 | Hedberg | H04W 48/20 455/437 |
| 2014/0204771 A1* | 7/2014 | Gao | H04W 36/28 370/252 |
| 2014/0341101 A1* | 11/2014 | Ganapathy | H04W 52/0206 370/311 |
| 2014/0342748 A1* | 11/2014 | Zou | H04W 72/0426 455/452.1 |
| 2015/0017976 A1* | 1/2015 | Liu | H04W 36/0033 455/423 |
| 2015/0131535 A1* | 5/2015 | Wallentin | H04W 76/025 370/329 |
| 2016/0112913 A1* | 4/2016 | Malkamaki | H04W 36/0055 455/444 |
| 2016/0143039 A1* | 5/2016 | Baldemair | H04W 72/1252 370/329 |
| 2016/0182276 A1* | 6/2016 | Wu | H04L 41/0654 370/225 |

OTHER PUBLICATIONS

3GPP TSG-RAN Meeting #62 RP-132069 Busan, Korea, Dec. 3-6, 2013; Source: NTT DOCoMo, Inc., NEC corporation Title: New Work Item Description: Dual Connectivity for LTE—Core Part.

3GPP TS 36.323 V112.0 (Mar. 2013) 3rd Generation Partnership Project; Technical Specification Group Radio Access Network; Evolved Universal Terrestrial Radio Access (E-UTRA); Packet Data Convergence Protocol (PDCP) specification (Release 11).

3GPP TR 36.842 V1.0.0 (Nov. 2013) 3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12).

International Search Report and Written Opinion for International Application No. PCT/EP2014/051932, mailed Jun. 6, 2014, 13 pages.

* cited by examiner

RETRANSMISSION OF PROTOCOL DATA UNIT VIA ALTERNATE TRANSMISSION PATH FOR DUAL CONNECTIVITY WIRELESS NETWORK

This application is a national stage entry of PCT Application No. PCT/EP2014/051932, filed Jan. 31, 2014, entitled "RETRANSMISSION OF PROTOCOL DATA UNIT VIA ALTERNATE TRANSMISSION PATH FOR DUAL CONNECTIVITY WIRELESS NETWORK", which claims priority to PCT Application No. PCT/EP2013/066676, filed Aug. 9, 2013, entitled "USE OF PACKET STATUS REPORT FROM SECONDARY BASE STATION TO MASTER BASE STATION IN WIRELESS NETWORK" which are hereby incorporated by reference in their entireties.

TECHNICAL FIELD

This description relates to wireless networks.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations, which are referred to as enhanced Node Bs (eNBs), provide wireless access within a coverage area or cell. In LTE, mobile devices, or mobile stations are referred to as user equipments (UE). LTE has included a number of improvements or developments.

SUMMARY

According to an example implementation, a method is provided for retransmitting data in a dual connectivity wireless network in which a mobile station (MS) is connected to a first base station (BS) via a first radio link and to a second BS via a second radio link. The method includes sending, by a Packet Data Convergence Protocol (PDCP) entity of the MS, a protocol data unit (PDU) to a first Radio Link Control (RLC) entity of the MS for transmission to the first BS via the first radio link, starting a transmission timer associated with the PDU, determining that the timer associated with the PDU has expired before receiving an indication of successful delivery of the PDU to the first BS, and re-sending, by the PDCP entity of the MS in response to the determining that the timer associated with the PDU has expired, the PDU to a second RLC entity of the MS for transmission to the second BS via the second radio link.

According to an example implementation of the method, the starting a timer may include starting a transmission timer associated with the PDU upon the PDCP entity of the MS sending the PDU to the first RLC entity of the MS for transmission to the first BS via the first radio link.

According to an example implementation of the method, the starting a timer may include starting a transmission timer associated with the PDU upon a transmission of the PDU from the first RLC entity.

According to an example implementation of the method, the first RLC entity of the MS is coupled to a first peer RLC entity at the first BS via the first radio link, and the second RLC entity of the MS is coupled to a second peer RLC entity at the second BS via the second radio link.

According to an example implementation of the method, the first RLC entity of the MS is coupled to a first peer RLC entity at the first BS via the first radio link, and wherein the first RLC entity of the MS provides an indication of successful PDU delivery to the PDCP entity of the MS for each PDU transmitted from the first RLC entity of the MS to the first peer RLC entity of the BS which is acknowledged to the first RLC entity as being received by the first peer RLC entity of the first BS.

According to an example implementation of the method, the second RLC entity of the MS is coupled to a second peer RLC entity at the second BS via the second radio link, and wherein the second RLC entity of the MS provides an indication of successful PDU delivery to the PDCP entity of the MS for each PDU transmitted from the second RLC entity of the MS to the second peer RLC entity of the BS which is acknowledged to the second RLC entity as being received by the second peer RLC entity of the second BS.

According to an example implementation, the method may further include stopping the timer associated with the PDU upon the re-sending of the PDU to the second RLC entity of the MS.

According to an example implementation, the method may further include allowing the timer associated with the PDU to re-start upon the re-sending of the PDU to the second RLC entity of the MS.

According to an example implementation, an apparatus is provided in a dual connectivity wireless network in which a mobile station (MS) is connected to a first base station (BS) via a first radio link and to a second BS via a second radio link. The apparatus may include at least one processor and at least one memory including computer instructions, when executed by the at least one processor, cause the apparatus to: send, by a Packet Data Convergence Protocol (PDCP) entity of the MS, a protocol data unit (PDU) to a first Radio Link Control (RLC) entity of the MS for transmission to the first BS via the first radio link, start a transmission timer associated with the PDU, determine that the timer associated with the PDU has expired before receiving an indication of successful delivery of the PDU to the first BS, re-send, by the PDCP entity of the MS in response to the determining that the timer associated with the PDU has expired, the PDU to a second RLC entity of the MS for transmission to the second BS via the second radio link.

According to another example implementation, a computer program product is provided for use in a dual connectivity wireless network in which a mobile station (MS) is connected to a first base station (BS) via a first radio link and to a second BS via a second radio link, the computer program product may include a non-transitory computer-readable storage medium and storing executable code that, when executed by at least one data processing apparatus, is configured to cause the at least one data processing apparatus to perform a method including: sending, by a Packet Data Convergence Protocol (PDCP) entity of the MS, a protocol data unit (PDU) to a first Radio Link Control (RLC) entity of the MS for transmission to the first BS via the first radio link, starting a transmission timer associated with the PDU, determining that the timer associated with the PDU has expired before receiving an indication of successful delivery of the PDU to the first BS, and re-sending, by the PDCP entity of the MS in response to the determining that the timer associated with the PDU has expired, the PDU to a second RLC entity of the MS for transmission to the second BS via the second radio link.

According to another example implementation, a method is provided for retransmitting data in a dual connectivity network in which a mobile station (MS) is connected to a first base station (BS) via a first radio link and to a second BS via a second radio link. The method includes transmitting a protocol data unit (PDU) from the MS to the first BS via the first radio link, starting a transmission timer associated with the PDU, determining that the timer associated with the PDU has expired before receiving at the MS an indication of successful delivery of the PDU to the first BS, and retransmitting, in response to the determining that the timer associated with the PDU has expired, the PDU from the MS to the second BS via the second radio link.

According to an example implementation of the method, the transmitting may include: sending, by a Packet Data Convergence Protocol (PDCP) entity of the MS, the PDU to a first Radio Link Control (RLC) entity of the MS, and transmitting the PDU from the first RLC entity of the MS to a first peer RLC entity of the first BS via the first radio link.

According to an example implementation of the method, the receiving at the MS an indication of a successful delivery of the PDU to the first BS may include: receiving, by the first RLC entity of the MS, an acknowledgement from the first peer RLC entity of the first BS that acknowledges that the PDU was received by the first peer RLC entity of the first BS, and the PDCP entity of the MS receiving an indication of a successful delivery of the PDU from the first RLC entity of the MS.

According to an example implementation of the method, the retransmitting may include: sending, by a Packet Data Convergence Protocol (PDCP) entity of the MS, the PDU to a second Radio Link Control (RLC) entity of the MS, and transmitting the PDU from the second RLC entity of the MS to a second peer RLC entity of the second BS via the second radio link.

According to an example implementation, an apparatus may be provided in a dual connectivity wireless network in which a mobile station (MS) is connected to a first base station (BS) via a first radio link and to a second BS via a second radio link. The apparatus may include at least one processor and at least one memory including computer instructions, when executed by the at least one processor, cause the apparatus to: transmit a protocol data unit (PDU) from the MS to the first BS via the first radio link, start a transmission timer associated with the PDU, determine that the timer associated with the PDU has expired before receiving at the MS an indication of successful delivery of the PDU to the first BS, retransmit, in response to the determining that the timer associated with the PDU has expired, the PDU from the MS to the second BS via the second radio link.

According to another example implementation, a computer program product is provided for use in a dual connectivity wireless network in which a mobile station (MS) is connected to a first base station (BS) via a first radio link and to a second BS via a second radio link. The computer program product may include a non-transitory computer-readable storage medium and storing executable code that, when executed by at least one data processing apparatus, is configured to cause the at least one data processing apparatus to perform a method including: transmitting a protocol data unit (PDU) from the MS to the first BS via the first radio link, starting a transmission timer associated with the PDU, determining that the timer associated with the PDU has expired before receiving at the MS an indication of successful delivery of the PDU to the first BS, and retransmitting, in response to the determining that the timer associated with the PDU has expired, the PDU from the MS to the second BS via the second radio link.

According to another example implementation, a method is provided for transmitting data in a dual connectivity wireless network in which a mobile station (MS) is connected to a first base station (BS) via a first radio link and to a second BS via a second radio link. The method may include sending, by a first protocol entity of the MS, a protocol data unit (PDU) to a first entity of a second protocol of the MS for transmission to the first BS via the first radio link, detecting a trigger condition at the MS associated with the PDU, and re-sending, by the first protocol entity of the MS, the PDU to a second entity of the second protocol of the MS for transmission to the second BS via the second radio link.

According to an example implementation, the first protocol entity may include a Packet Data Convergence Protocol (PDCP) entity at the MS.

According to an example implementation, the first entity of the second protocol may include a first Radio Link Control (RLC) entity at the MS, and the second entity of the second protocol may include a second RLC entity at the MS.

According to an example implementation, the first protocol entity is a higher layer protocol entity than the first entity of the second protocol and the second entity of the second protocol.

According to an example implementation, the detecting a trigger condition may include: starting a transmission timer associated with the PDU, and determining that the timer associated with the PDU has expired before the first protocol entity receives an indication of successful delivery of the PDU to the first BS.

According to an example implementation, the starting a transmission timer may include starting a transmission timer associated with the PDU when the first protocol entity sends the PDU to the first entity of the second protocol.

According to an example implementation, the starting a transmission timer may include starting a transmission timer associated with the PDU when first entity of the second protocol transmits the PDU to the first BS via the first radio link.

According to an example implementation, the detecting a trigger condition may include receiving, by the first protocol entity of the MS from the first entity of the second protocol of the MS, an indication that a maximum number of attempts to transmit at least portion of the PDU has failed.

According to an example implementation, the first protocol entity may include a Packet Data Convergence Protocol (PDCP) entity at the MS, the first entity of the second protocol may include a first Radio Link Control (RLC) entity at the MS, and the second entity of the second protocol may include a second RLC entity at the MS, wherein the detecting a trigger condition includes receiving, by the PDCP entity of the MS from the first RLC entity of the MS, an indication that a maximum number of attempts to transmit at least portion of the PDU has failed.

According to an example implementation, an apparatus is provided in a dual connectivity wireless network in which a mobile station (MS) is connected to a first base station (BS) via a first radio link and to a second BS via a second radio link. The apparatus including at least one processor and at least one memory including computer instructions, when executed by the at least one processor, cause the apparatus to: send, by a first protocol entity of the MS, a protocol data unit (PDU) to a first entity of a second protocol of the MS for transmission to the first BS via the first radio link, detect a trigger condition at the MS associated with the PDU, and re-send, by the first protocol entity of the MS, the PDU to a second entity of the second protocol of the MS for transmission to the second BS via the second radio link.

A computer program product is provided for use in a dual connectivity wireless network in which a mobile station (MS) is connected to a first base station (BS) via a first radio link and to a second BS via a second radio link. The computer program product includes a non-transitory computer-readable storage medium and storing executable code that, when executed by at least one data processing apparatus, is configured to cause the at least one data processing apparatus to perform a method including: sending, by a first protocol entity of the MS, a protocol data unit (PDU) to a first entity of a second protocol of the MS for transmission to the first BS via the first radio link, detecting a trigger condition at the MS associated with the PDU, and re-sending, by the first protocol entity of the MS, the PDU to a second entity of the second protocol of the MS for transmission to the second BS via the second radio link.

The details of one or more implementations are set forth in the accompanying drawings and the description below. Other features will be apparent from the description and drawings, and from the claims.

DETAILED DESCRIPTION

According to an example implementation, a technique is provided for retransmitting data in a dual connectivity network in which a mobile station (MS) is connected to a first base station (BS) via a first radio link and to a second BS via a second radio link. The technique includes sending, by a first protocol entity of the MS, a protocol data unit (PDU) to a first entity of a second protocol of the MS for transmission to the first BS via the first radio link, detecting a trigger condition at the MS associated with the PDU, and re-sending, by the first protocol entity of the MS, the PDU to a second entity of the second protocol of the MS for transmission to the second BS via the second radio link. In an example implementation, the first protocol entity may include a Packet Data Convergence Protocol (PDCP) entity at the MS, the first entity of the second protocol may include a first Radio Link Control (RLC) entity at the MS, and the second entity of the second protocol may include a second RLC entity at the MS.

According to an example implementation, the detecting a trigger condition may include: starting a transmission timer associated with the PDU, and determining that the timer associated with the PDU has expired before the first protocol entity receives an indication of successful delivery of the PDU to the first BS.

According to another example implementation, the detecting a trigger condition may include receiving, by the first protocol entity of the MS from the first entity of the second protocol of the MS, an indication that a maximum number of attempts to transmit at least portion of the PDU has failed.

According to another example implementation, a technique is provided for retransmitting data in a dual connectivity network in which a mobile station (MS) is connected to a first base station (BS) via a first radio link and to a second BS via a second radio link, including transmitting a protocol data unit (PDU) from the MS to the first BS via the first radio link, starting a transmission timer associated with the PDU, and determining that the timer associated with the PDU has expired before receiving at the MS an indication of successful delivery of the PDU to the first BS, and retransmitting, in response to the determining that the timer associated with the PDU has expired, the PDU from the MS to the second BS via the second radio link.

Another example implementation may include sending, by a Packet Data Convergence Protocol (PDCP) entity of the MS, a protocol data unit (PDU) to a first Radio Link Control (RLC) entity of the MS for transmission to the first BS via the first radio link, starting a transmission timer associated with the PDU, determining that the timer associated with the PDU has expired before receiving an indication of successful delivery of the PDU to the first BS, and re-sending, by the PDCP entity of the MS in response to the determining that the timer associated with the PDU has expired, the PDU to a second RLC entity of the MS for transmission to the second BS via the second radio link.

Figure 1:
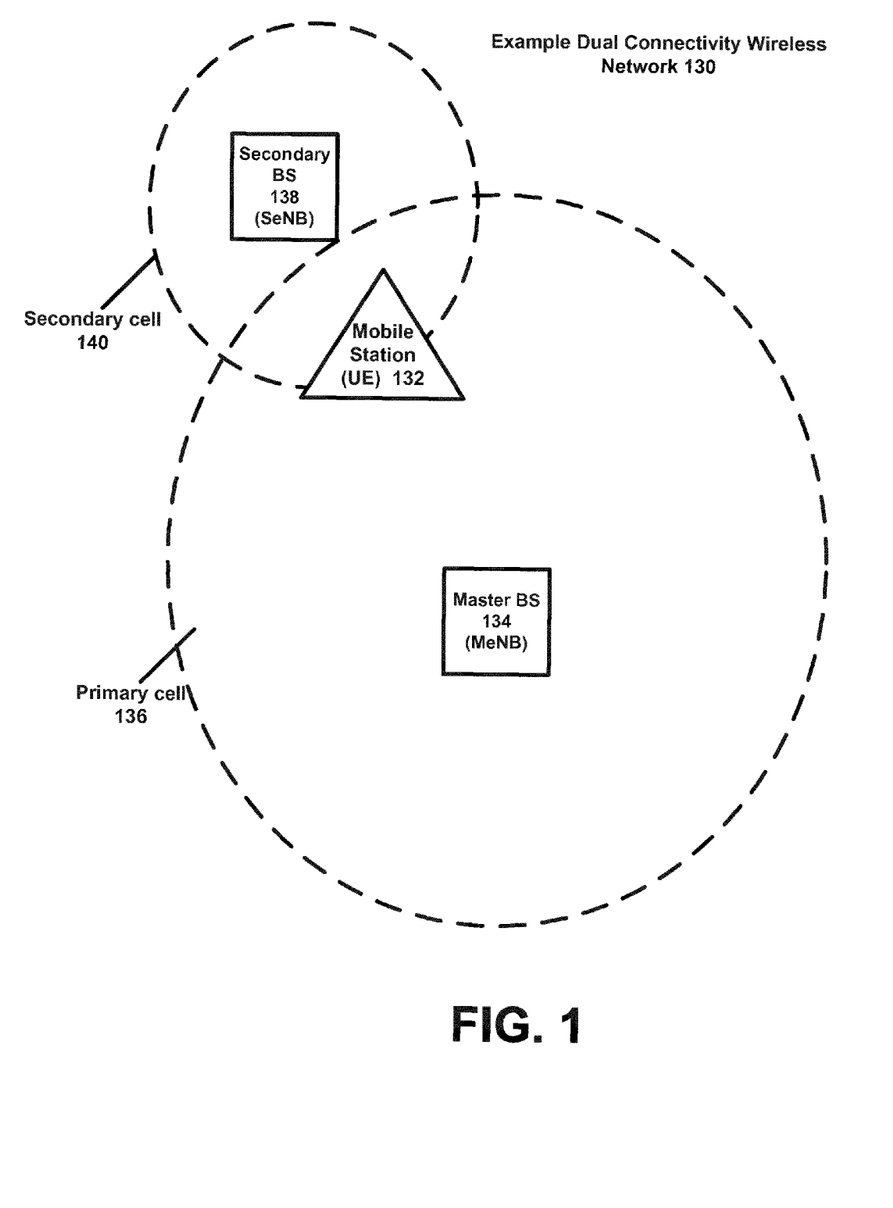
FIG. 1 is a block diagram of a dual connectivity wireless network 130 according to an example implementation.

FIG. 1 is a block diagram of a dual connectivity wireless network 130 according to an example implementation. In the wireless network 130 of FIG. 1, a mobile station (MS) 132, which may also be referred to as a user equipment (UE), may be connected (and in communication) with multiple base stations (BSs), which may also be referred to as enhanced Node Bs (eNBs). The MS 132 may be connected (and in communication) with a master BS 134 (MeNB) which provides wireless coverage within a primary cell 136. Master BS 134 may sometimes be referred to as a macro BS, or macro eNB, or other name. The MS 132 may also be simultaneously connected to and/or in communication with a secondary BS 138 (SeNB), which provides wireless coverage within a secondary cell 140.

Therefore, according to one example implementation, a dual connectivity wireless network allows for a MS (such as MS 132) to be simultaneously connected to multiple base stations, e.g., simultaneously connected to both a master BS (or MeNB) 134, and a secondary BS (SeNB) 138. A dual connectivity wireless network, such as the network 130 shown in FIG. 1 may have several advantages, such as, for example, decreasing a signaling load towards the core network, sharing traffic/packet processing among multiple base stations, as well as benefitting from flexible resource usage where one or more carriers may be used on a radio link between the MS and each BS, e.g., inter-site carrier aggregation (although carrier aggregation is not required). While there are advantages to a MS being connected simultaneously to two or more BSs, this dual connectivity arrangement may present opportunities where at least some kinds of events, functions or operations can be coordinated among the connected BSs for a MS, for example.

Figure 2:
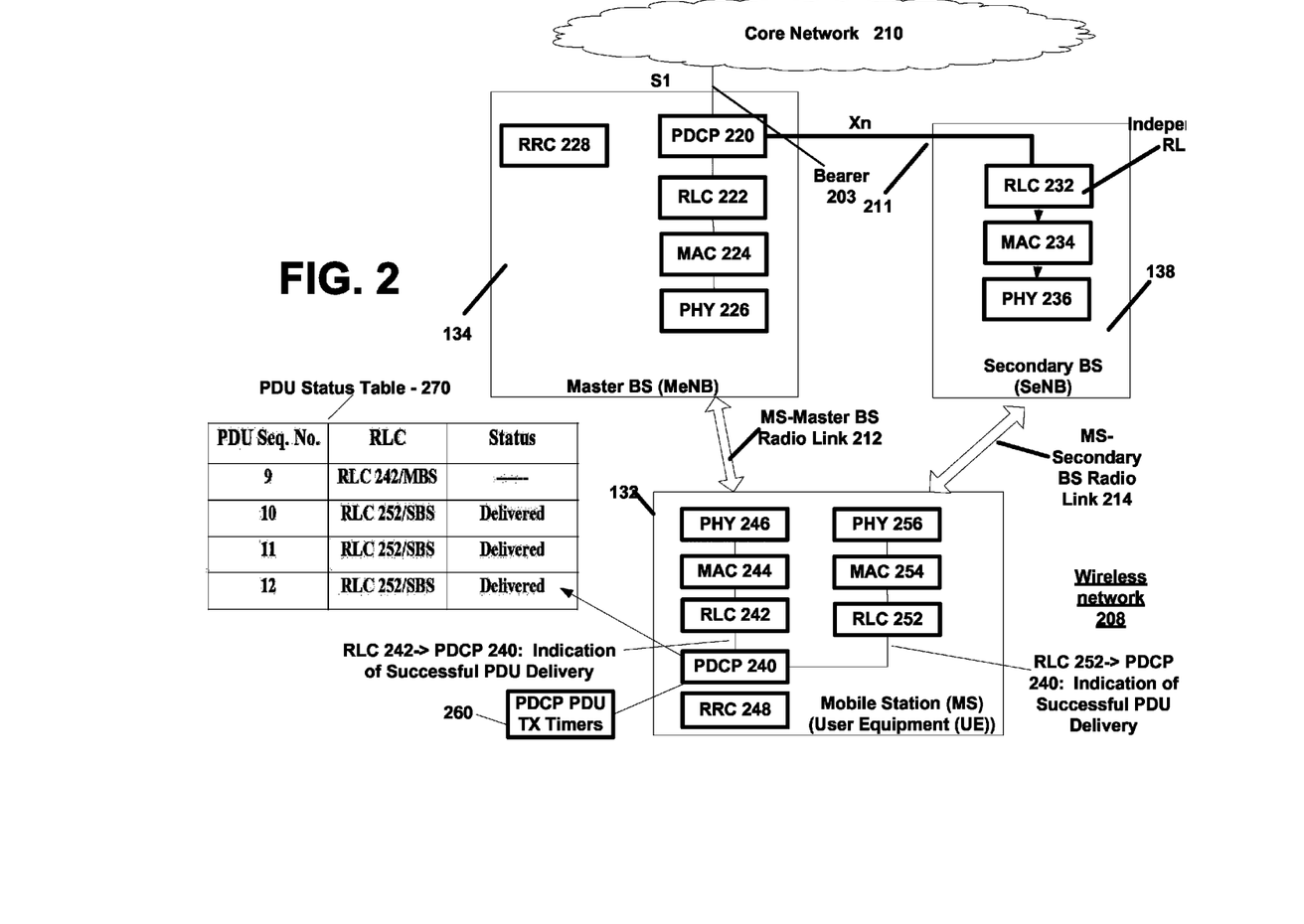
FIG. 2 is a block diagram illustrating a dual connectivity wireless network in more detail according to an example implementation.

FIG. 2 is a block diagram illustrating a dual connectivity wireless network 208 in more detail according to an example implementation. Although not shown, each BS and the MS includes a processor, memory and multiple wireless transceivers (wireless transmitter/receiver). Master (or macro) BS 134 and secondary BS 138 may be connected via a bidirectional backhaul connection (which may be wired or wireless), which is shown in FIG. 2 as an Xn interface. One or both of BSs 134, 138 may be connected to the core network 210 via a bidirectional S1 interface. A MS 132 may be simultaneously connected to master BS 134 via a MS-master BS radio link 212 and to secondary BS 138 via a MS-secondary BS radio link 214.

MS 132, BS 134 and BS 138 each includes at least one radio protocol stack that may be implemented in hardware and/or software. According to an example implementation, a protocol stack may include logic, and/or computer instructions executed by a processor to perform the functions or operations for each entity of the protocol stack. An example protocol stack for the master BS 134 may include, for example, at least a Packet Data Convergence Protocol (PDCP) entity 220, a Radio Link Control (RLC) entity 222, a Media Access Control (MAC) entity 224, a Physical layer (PHY) entity 226, and a Radio Resource Control (RRC) entity 228.

The PDCP entity 220A performs ciphering (encryption and decryption of data) and header compression-decompression. There is one PDCP entity 222A per radio bearer configured for a MS. The RLC entity 222 performs segmentation/concatenation, error detection and correction, data retransmission, duplicate detection and in-sequence data delivery to higher layers. According to an example implementation, there may be one RLC entity per radio bearer or multiple RLC entities per radio bearer configured for a MS, and one RLC entity corresponding to one logical channel. According to one example implementation, the radio protocol stack may include two RLC entities per radio bearer. MAC entity 224 performs multiplexing of logical channels (where there may be one or more logical channel per radio bearer), hybrid ARQ retransmissions, inserting of MAC control elements (MAC CEs) used for in-band control signaling, and other MAC-related functions. The BS MAC entity 224 also performs uplink and downlink scheduling (located in MAC entity of each BS). The MAC entity 224 provides services to the RLC entities in the form of logical channels. The PHY entity 226 handles or performs coding/decoding, modulation/demodulation, multi-antenna mapping, and other physical layer functions. Multiple RLC entities within a BS may share one MAC entity 224 and one PHY entity 226.

RRC entity 228 is responsible for handling a number of functions or procedures related to the Radio Access Network (RAN) (e.g., shown in FIGS. 1-2), including broadcast of system information necessary for the MS to be able to communicate with a cell or BS, transmission of paging messages originating from the core network 210 to notify a MS about incoming connection requests, connection management including setting up bearers and mobility, mobility functions such as cell selection and reselection, and other control related functions.

According to an example implementation, the LTE (for example) Radio Access Network (RAN), which includes a group of BSs or eNBs, provides one or more radio bearers. A radio bearer generally provides a radio/wireless transport service between two points. For example, packets may be mapped to bearers according to their QoS (quality of service) requirements and the destination (IP address or MS) of the packets. In an example implementation, a bearer may be identified by a combination of a QoS class identifier (QCI) (identifying a QoS for the packets) and an IP address of a destination MS. A bearer may include packets of multiple services which require the same QoS (delay, priority, etc.) and directed to/from the same IP address/MS address. Some example QoSs may include a guaranteed bit rate (GBR) and a maximum bit rate (MBR). According to an example implementation, RRC messages may be sent via signaling radio bearers, while data signals and voice signals may be sent via data radio bearers. A radio bearer may be mapped to one or more logical channels.

Referring to FIG. 2, a bearer 203 is shown, although other bearers may be provided as well. Within master BS 134, a PDCP/RLC protocol stack may be provided for each bearer and/or for each logical channel, wherein a plurality of PDCP and RLC entities may typically share a common MAC entity 224 and a common PHY entity 226. For example, a protocol stack that may include PDCP entity 220, RLC entity 222, MAC entity 224 and PHY entity 226 may be provided to handle or process data for a voice radio bearer (or for a first logical channel) to/from MS 132, while a separate PDCP/RLC stack (not shown) may be provided for a data radio bearer (or for a second logical channel) to/from MS 132. This is merely an example implementation, and other implementations may be used.

Secondary BS 138 may include protocol entities that are the same or similar to those of master BS 134. For example, secondary BS 138 may include a RLC entity 232, a MAC entity 234, and a PHY entity 236. However, in one example implementation, in the scope of a given MS 132, secondary BS 138 does not include a PDCP entity, but rather, both master BS 134 and secondary BS 138 rely on a common (or shared) PDCP entity 220 to handle packets (perform PDCP functions) for bearer 203.

Thus, in the scope of a given MS a common PDCP entity 220 may be provided or shared among master BS 134 and secondary BS 138 for bearer 203, while each of BS 134 and BS 138 includes separate RLC, MAC and PHY entities. For example, in the downlink direction (traffic or data received from core network 210), data or packets for the bearer 203 may be split into two paths, including a first path within master BS 134 (some of the received traffic passed to RLC entity 222), and a second path for at least some of the data/traffic for bearer 203 to be directed to RLC entity 232 of secondary BS 138 via Xn interface, for example. In the uplink direction for bearer 203, traffic from the RLC 232/MAC 234 entities of secondary BS 138 and traffic from the RLC 222/MAC 224 entities of the master BS 134 are both fed or input (e.g., via separate paths) to common PDCP entity 220 for transmission over core network 210, for example.

MS 132 includes protocol entities that communicate with the peer entities at the master BS 134 and/or secondary BS 138. Therefore, the protocol entities at MS 132 may mirror the protocol entities and BS 138 and BS 134. Therefore, according to an example implementation, MS 132 may include a two RLC/MAC/PHY protocol stacks and a shared PDCP entity that is shared by both RLC/MAC/PHY protocol stacks. For example, MS 132 includes a PHY 246/MAC 244/RLC 242 and PDCP 240 protocol stack that communicate via MS-master BS radio link 212 to peer protocol entities at master BS 134 including PHY 226/MAC 224/RLC 222/PDCP 220, respectively. Similarly, MS 132 also includes a PHY 256/MAC 254/RLC 252 entities that communicate via MS-secondary BS radio link 214 to peer entities at secondary BS 138 including PHY 236/MAC 234 and RLC 232, respectively. In a similar to manner (e.g., similar in structure and operation) in which RLC entity 232 at BS 138 and RLC entity 222 at BS 134 share one PDCP entity 220, the two RLC entities 252 and 242 of MS 132 share a single PDCP entity 240 at MS 132. These protocol entities at MS 132 may, for example, perform the same or very similar functions as performed by the peer protocol entities of the master BS 134 and secondary BS 138.

However, as shown in FIG. 2, in the case of bearer 203 that is split at master BS into two data paths, there is only one PDCP entity 220 for bearer 203 at master BS 134, and no PDCP entity at the secondary BS 138. That is, with respect to split bearer 203, the single PDCP entity 220 at master BS 134 is provided for handling data to/from both master BS 134 and secondary BS 138.

Similarly, there is only one PDCP entity 240 at MS 132 to handle data for split bearer 203 to/from both master BS 134 (via radio link 212) and secondary BS 138 (via radio link 214). Therefore, for example, MS 132 may include one PDCP entity 240 (which would be a peer entity for PDCP entity 220 for bearer 203) and two RLC entities, including RLC entities 242 and 252, which operate as peer entities for RLC entities 222 and 232, at least for bearer 203.

A radio link 212 may be established between MS 132 and master BS 134, and this radio link may include or may handle one or more bearers, such as bearers 203 and 205. Each bearer may be mapped to (or may include) one or more logical channels. Similarly, a radio link 214 may be established between MS 132 and secondary BS 138. The radio link 214 may include one or more bearers, such as bearer 203, and the bearer may include one or more logical channels.

According to an example implementation, RLC entity 222 (in master BS 134) and RLC entity 232 (in secondary BS 138) may operate as independent RLC entities. In this example implementation, data for bearer 203 may be split by master BS 134, with some data for bearer 203 being transmitted by master BS 134 over radio link 212 and some data of the radio bearer 203 being transmitted by secondary BS 138 over radio link 214. For example, as shown in FIG. 2, PDCP entity 220 may generate PDCP PDUs, and assign a PDCP sequence number to each PDCP PDU. PDCP entity 220 may then provide PDCP PDUs to each RLC entity (222 and 232), with each PDCP PDU having a PDCP PDU sequence number. Each independent RLC entity (222 and 232) may then, for example, generate RLC protocol data units (PDUs) and assign a RLC PDU sequence number, before forwarding the RLC PDU(s) to its respective MAC entity/PHY entity for transmission to MS 132. For example, RLC 222 may receive some data from PDCP entity 220 and generate some RLC PDUs, with RLC PDU sequence numbers assigned to RLC PDUs by RLC entity 222. Similarly, RLC entity 232 may also receive some other data (or other PDCP PDUs) from PDCP entity 220, generate RLC PDUs and assign a RLC PDU sequence number to each RLC PDU. In one example implementation, each RLC entity (232, 222) may independently receive ACKs (acknowledgements) and NAKs (negative acknowledgements) from MS 132 for PDUs transmitted from the respective RLC entity, and handle any retransmissions as necessary.

In the uplink direction, RLC entities 222 and 232 may each receive RLC PDUs from the peer RLC entities 242 and 252, respectively (from MS 132). The receiving RLC entities 222 and 232 may each send an acknowledgement(s) for received RLC PDUs to their peer RLC entity at MS 132, strip off the RLC header, and then send or pass the data (RLC service data units or RLC SDUs) up to the PDCP entity 220. PDCP entity 220 may receive data (packets) or RLC SDUs from both RLC entities 222, 232, and this data may be out of order based on data being sent via both radio link 212 to master BS 134 and via radio link 214 to secondary BS 138. PDCP 220 may then re-order the received packets or received RLC SDUs so that they are in order, and this data is passed in order up to a higher layer at BS 134 for sending to core network 210.

According to an example implementation, RLC entities 242 and 252 in MS 132 may also operate as independent RLC entities, similar to RLC entities 222, 232. In the downlink direction, RLC entities 242 and 252 may each receive RLC PDUs from their peer RLC entities 222 and 232, respectively. Upon receiving a RLC PDU, the receiving RLC entities 242 and 252 may each send an acknowledgement(s) for received RLC PDUs to their respective peer RLC entities 222 and 232. RLC entities 242 and 252 may then strip the RLC header from each received RLC PDU, and pass the resulting RLC SDU (or data) to PDCP 240, where the data is re-ordered into its correct order, as necessary, before passing or sending this data to upper layers at MS 132.

In the uplink direction at MS 132, PDCP entity 240 generates PDCP PDUs, and assigns a PDCP PDU sequence number to each PDCP PDU. Some of the PDCP PDUs are then passed or sent to RLC entity 242 for transmission via radio link 212 to master BS 134, while other PDCP PDUs are passed or sent to RLC entity 252 for transmission to secondary BS via radio link 214. Each RLC entity (242 and 252) at MS 132 may then, for example, generate RLC protocol data units (PDUs) and assign a RLC PDU sequence number to each RLC PDU, before forwarding the RLC PDU(s) to its respective MAC entity/PHY entity for transmission to either BS 134 or 138.

Also, for uplink transmission from MS 132, each RLC entity (242, 252) at MS 132 may independently receive ACKs (acknowledgements) and NAKs (negative acknowledgements) from their peer RLC entity (222, 232) for RLC PDUs transmitted, and handle any retransmissions as necessary. In general, each of the transmitting RLC entities 242, 252 may retransmit RLC PDUs to a peer RLC entity (222 or 232) if an ACK is not received by the transmitting RLC entity before a RLC PDU timer associated with a RLC PDU expires, for example. For example, if RLC entity 242 transmits RLC PDU 2 to RLC entity 222, but RLC entity 242 does not receive an ACK from RLC entity 222 before a RLC PDU timer expires for RLC PDU 2, then RLC entity 242 may retransmit the RLC PDU 2 to the same RLC entity 222, e.g., via same radio link 212, according to this example.

However, in some cases a problem may arise in the communication of data between an RLC entity 242 or RLC entity 252 and its peer RLC entity 222 or 232, respectively, which may delay the transmission of a RLC PDU, or prevent its transmission altogether. For example, congestion at MAC 244 may delay RLC PDUs being transmitted via radio link 212 to RLC 222 of master BS 134. Similarly, a radio link failure of radio link 212, or a failure in one or more protocol entities or hardware, etc., between RLC 242 and RLC 222 may prevent the transmission of RLC PDUs from RLC 242 to peer RLC 222 at BS 134. In such a case, either due to a delayed delivery of the PDU, or a failed PDU transmission due to a complete failure of a radio link, protocol entity or other structure, it may take the RLC entity 242 a significant amount of time to eventually transmit the RLC PDU, or (in the event of a failure) to detect a radio link failure and reschedule the transmission of the RLC PDU. This delay at the RLC may be caused by, for example, the RLC PDU timer for the RCL PDU would timeout before RLC entity 242 would retransmit the RLC PDU on the same RLC and radio link as the original transmission of the PDU, and several retransmission attempts would be performed, up to a maximum number of retries, before reporting the radio link 212 as failed.

According to an example implementation, a retransmission technique may be implemented by the PDCP entity 240 at the MS 132. In an example implementation, the PDCP retransmission technique may be implemented in a dual connectivity network in which the MS 132 is connected to multiple base stations, such as being connected to a master BS 134 and secondary BS 138, for example. According to an example implementation, a PDCP PDU initially transmitted via a first RLC entity to a first BS, which is not successfully delivered to a peer PDCP entity 220 within a timer value or selected timeout period, may be retransmitted via a second RLC entity to a second BS. In some cases, use of this PDCP retransmission technique may decrease delays in data transmission, for example.

Referring to FIG. 2, PDCP entity 240 of MS 132 may generate a PDCP PDU, and assign a PDCP PDU sequence number to such PDCP PDU (e.g., PDCP PDU sequence number 9). In this example, PDCP PDU 9 is passed or sent to RLC entity 242 for transmission to master BS 134 via radio link 212. Based on the PDCP PDU 9, RLC entity 242 may generate a RLC PDU (including a RLC sequence number), and send the RLC PDU to a peer RLC entity 222 via radio link 212, for example. If such RLC PDU(s), corresponding to the PDCP PDU 9 is successfully delivered to the peer RLC 222, then such peer RLC 222 would provide an ACK(s) to RLC 242 for the RLC PDU. As shown in FIG. 2, RLC entities 242 and 252 of MS 132 may provide to PDCP 240 indications of successful data delivery, e.g., indicating that PDCP PDU 9 was delivered to RLC entity 222. As shown in the example PDU status table 270, PDCP 240 may keep track of which PDCP PDUs have been successfully delivered (e.g., delivered to the peer RLC entity 222, or delivered to the target BS (134) in general). The PDU status table 270 (or PDU status information), which may be stored or maintained by PDCP entity 240, may be updated by PDCP entity 240 based on PDU delivery indication information received by PDCP entity 240 from RLC entities 242 and 252, for example.

In addition, a PDCP PDU transmission timer 260 may be provided for each of a plurality of PDCP PDUs. For example, a PDCP PDU transmission timer may be initialized to a particular value, and may be started (e.g., counting down) when the PDCP PDU is sent or passed from the PDCP entity (e.g., PDCP entity 240) to the assigned RLC entity (e.g., RLC entity 242) for transmission. Alternatively, for example, the PDCP PDU transmission timer may be started for a PDCP PDU when the PDU is transmitted by the assigned RLC entity (e.g., RLC entity 242 in this example).

According to an example implementation, in response to determining that the PDCP PDU transmission timer for PDCP PDU 9 has expired before RLC entity 242 (the assigned RLC entity) has indicated to PDCP entity 240 that such PDU has been delivered to peer RLC entity 222 or to destination BS 134, PDCP entity 240 may resend the PDCP PDU 9 via a different RLC entity (e.g., RLC entity 252) at the MS 132 for transmission over a different radio link (e.g., radio link 214) and/or for delivery to a different RLC entity and different BS, as compared to the original sending and transmission of the PDCP PDU.

Thus, for example, PDCP entity 240 may initially send or pass PDCP PDU 9 to RLC entity 242 for transmission to peer RLC 222 of BS 134 via radio link 212. A PDCP PDU transmission timer is set for PDCP PDU 9, e.g., upon sending the PDU 9 to RLC 242, or upon its transmission from RLC 242, as examples. In this example, the transmission timer associated with PDCP PDU 9 expires before RLC 242 provides an indication of delivery for this PDCP PDU 9 to PDCP 240, e.g., possibly due to some delay, or a problem with radio link 212 that may delay or prevent PDU transmission, for example. Therefore, based on the expiration of the PDCP PDU timer for PDCP PDU 9, (e.g., independently from how RLC entities 242/222 may deal with such delay or non-transmission), PDCP entity 240 may resend the PDCP PDU 9 to RLC entity 252 for transmission to peer RLC entity 232 of BS 138 via radio link 214.

In one example implementation, the PDCP PDU transmission timer may be reset or re-initialized, and then re-started, when (or upon) the resending of the PDU to the second RLC entity (e.g., RLC entity 252 in this example). In another example implementation, the PDU transmission timer is reset or re-initialized, but not re-started upon the resending of the PDCP PDU 9 to the second RLC entity (e.g., RLC entity 252).

The above example has been described for the case where a PDCP PDU was transmitted but not delivered from RLC entity 242, and was re-sent via RLC entity 252. The same or similar operation may be performed for the other case, e.g., where the PDCP PDU was first sent to RLC entity 252 for transmission to peer RLC entity 232 of BS 138, and where the PDU transmission timer for this PDU expired before the PDCP entity 240 received an indication of PDU delivery from RLC entity 252. Therefore, in this case, the PDCP entity 240 may then resend the PDU to the RLC entity 242 for transmission to peer RLC entity 222 of BS 134.

Therefore, according to a more general implementation, a method of retransmitting data in a dual connectivity network may be performed, e.g., in which a MS 132 is connected to a first BS (e.g., BS 134) via a first radio link (e.g., radio link 212) and a second BS (e.g., BS 138) via a second radio link (e.g., radio link 214). The method may include transmitting a PDU from the MS to the first BS via the first radio link, and starting a transmission timer (e.g., transmission timer 260) associated with the PDU, determining that the timer has expired before receiving at the MS an indication of successful delivery of the PDU to the first BS, and then retransmitting, in response to determining that the timer has expired, the PDU from the MS to the second BS via the second radio link.

According to yet another example implementation, a technique may include transmitting data in a dual connectivity wireless network in which a mobile station (MS) 132 is connected to a first base station (BS) via a first radio link and to a second BS via a second radio link. For example, MS 132 may be connected to a master BS 134 and a secondary BS 138. According to an example implementation, a first protocol entity (e.g., PDCP entity 240) of the MS 132 a protocol data unit (PDU) to a first entity of a second protocol (e.g., RLC entity 242) of the MS 132 for transmission to the first BS (e.g., BS 134) via the first radio link (e.g., via radio link 212).

The technique may include detecting (e.g., by the PDCP entity 240) a trigger condition at the MS 132 associated with the PDU. The first protocol entity (e.g., PDCP 240) may then re-send the PDU to a second entity of the second protocol (e.g., RLC entity 252) of the MS 132 for transmission to the second BS (e.g., BS 138) via the second radio link (e.g., via radio link 214). Although PDCP and RLC entities are used as examples, other protocol entities may be used.

In an example implementation, the first protocol entity may be a higher layer protocol entity than the first entity of the second protocol and the second entity of the second protocol. For example, the PDCP entity 240 is a higher layer protocol entity than RLC entities 242, 252.

Different types of trigger conditions may be used to cause the PDU to be re-sent via a different path or via a different RLC entity or different radio link. According to a first example implementation, the detecting a trigger condition may include 1) starting a transmission timer (e.g., PDCP PDU transmission timer 260) associated with the PDU, and then 2) determining or detecting that the transmission timer associated with the PDU has expired before the first protocol entity receives an indication of successful delivery of the PDU to the first BS.

For example, PDCP entity 240 may set or initialize a transmission timer associated with the PDU, and then may start the transmission timer for the PDU when the PDCP entity 240 sends or passes the PDU to RLC entity 242 for transmission to RLC entity 222 of BS 134, via radio link 212, or when RLC entity 242 transmits the PDU. If the transmission timer (e.g., 260) associated with the PDU expires before PDCP entity 240 receives an indication of successful delivery of the PDU from RLC entity 242, then this trigger condition (expiration of transmission timer for PDU before receipt of indication of delivery) may cause the PDCP entity 242 to re-send the PDU to a different RLC entity, such as to RLC entity 252 for transmission to RLC entity 232 of BS 138 via radio link 214. RLC entity 242 may provide an indication of successful PDU delivery to PDCP entity 240 based, for example, on RLC entity 242 receiving an ACK from peer RLC entity 222 for one or more corresponding RLC PDUs.

In an example implementation, once a PDCP PDU transmission timer expires, causing the PDCP entity 240 to re-send the PDU via alternate RLC entity 252 (and via different radio link 214 and BS 138), then RLC entity 242 may discontinue attempting to retransmit the PDU. Therefore, PDCP entity 240 may send a retransmission cancellation notice to RLC entity 242 (the RLC entity that was originally transmitting the delayed PDU) to indicate or instruct the RLC entity 242 that the delayed PDU is being retransmitted via a separate RLC entity (and separate radio link/BS) and/or to indicate or instruct the RLC entity 242 to cancel any further retransmission attempts for the delayed PDU. For example, in response to receiving such a retransmission cancellation notice, RLC 242 may abandon or cancel any further retransmission attempts for the PDU, since PDCP entity 240 has already made arrangements to have such PDU transmitted via the alternate path of RLC 252/radio link 214 to BS 138, for example, based on the dual connectivity for MS 132.

According to a second example implementation, the detecting a trigger condition may include receiving, by the first protocol entity of the MS from the first entity of the second protocol of the MS, an indication that a maximum number of attempts to transmit at least portion of the PDU has failed. For example, if RLC entity 242 does not receive an ACK from peer RLC entity 222 for a transmitted PDU, e.g., within a timeout value after transmitting the PDU, then the RLC entity 242 may typically retransmit the PDU to the peer RLC entity 222, up to a maximum number of transmission attempts. Once the maximum number of transmission attempts have been made/performed, then RLC entity 242 may typically not attempt further transmissions for the PDU, and may report the error to higher layers.

In this example, the RLC entity 242 reaching a maximum number of transmission attempts for the PDU without receiving an ACK may be a trigger condition. In this example implementation, once the RLC entity 242 reaches the maximum number of transmission attempts for the PDU, the RLC entity 242 may notify PDCP entity 240 that a maximum number of transmission attempts have been reached, or have failed to transmit the PDU to the peer RLC or destination BS. In such case, this trigger condition (RLC entity 242 reaching a maximum number of transmission attempts for the PDU without receiving an ACK for such PDU), then the PDCP 240 may resend such PDU to RLC 252 for transmission to BS 138 via radio link 214.

For example, RLC entity 242 may notify PDCP entity 240 that a maximum number of transmission attempts have been reached for the PDU, e.g., if this condition occurs before the PDCP PDU transmission timer has expired.

Therefore, a dual connectivity network (e.g., MS 132 connected to BS 134 and BS 138) may offer multiple independent transmission paths (e.g., via different RLC entities and different radio links, and/or directed or transmitted to different BSs). According to an example implementation, a protocol entity, such as a PDCP entity 240 at MS 132, may use a different transmission path (e.g., RLC entity 252, radio link 214) if transmission of a PDU via a first transmission path (e.g., RLC entity 242 and radio link 212) has failed to transmit the PDU, e.g., within a certain time period.

Figure 3:
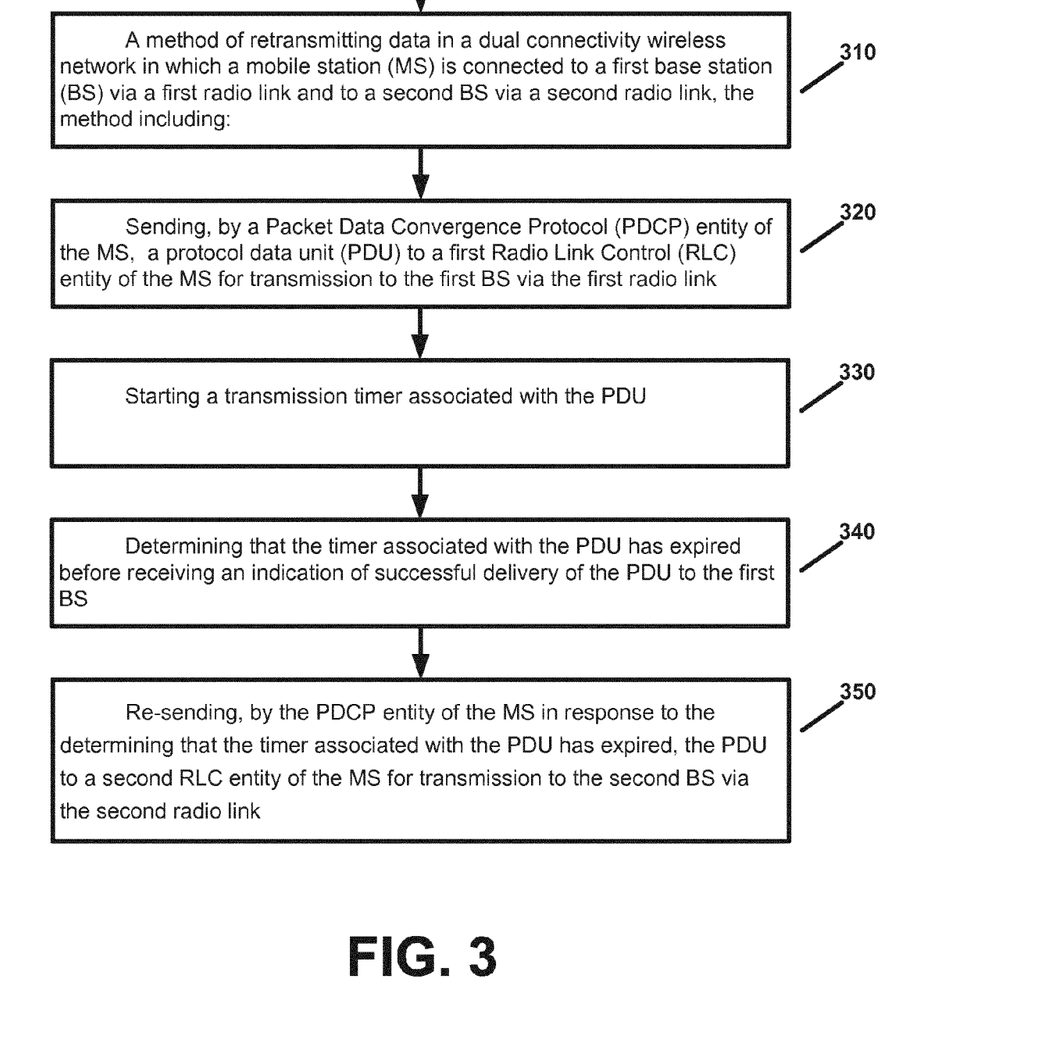
FIG. 3 is a flow chart illustrating operation of a mobile station according to an example implementation.

FIG. 3 is a flow chart illustrating operation of a mobile station according to an example implementation. At 310, a method is provided for retransmitting data in a dual connectivity wireless network in which a mobile station (MS) is connected to a first base station (BS) via a first radio link and to a second BS via a second radio link. The method includes: Operation 320 includes sending, by a Packet Data Convergence Protocol (PDCP) entity of the MS, a protocol data unit (PDU) to a first Radio Link Control (RLC) entity of the MS for transmission to the first BS via the first radio link. Operation 330 includes starting a transmission timer associated with the PDU. Operation 340 includes determining that the timer associated with the PDU has expired before receiving an indication of successful delivery of the PDU to the first BS. Operation 350 includes re-sending, by the PDCP entity of the MS in response to the determining that the timer associated with the PDU has expired, the PDU to a second RLC entity of the MS for transmission to the second BS via the second radio link.

Figure 4:
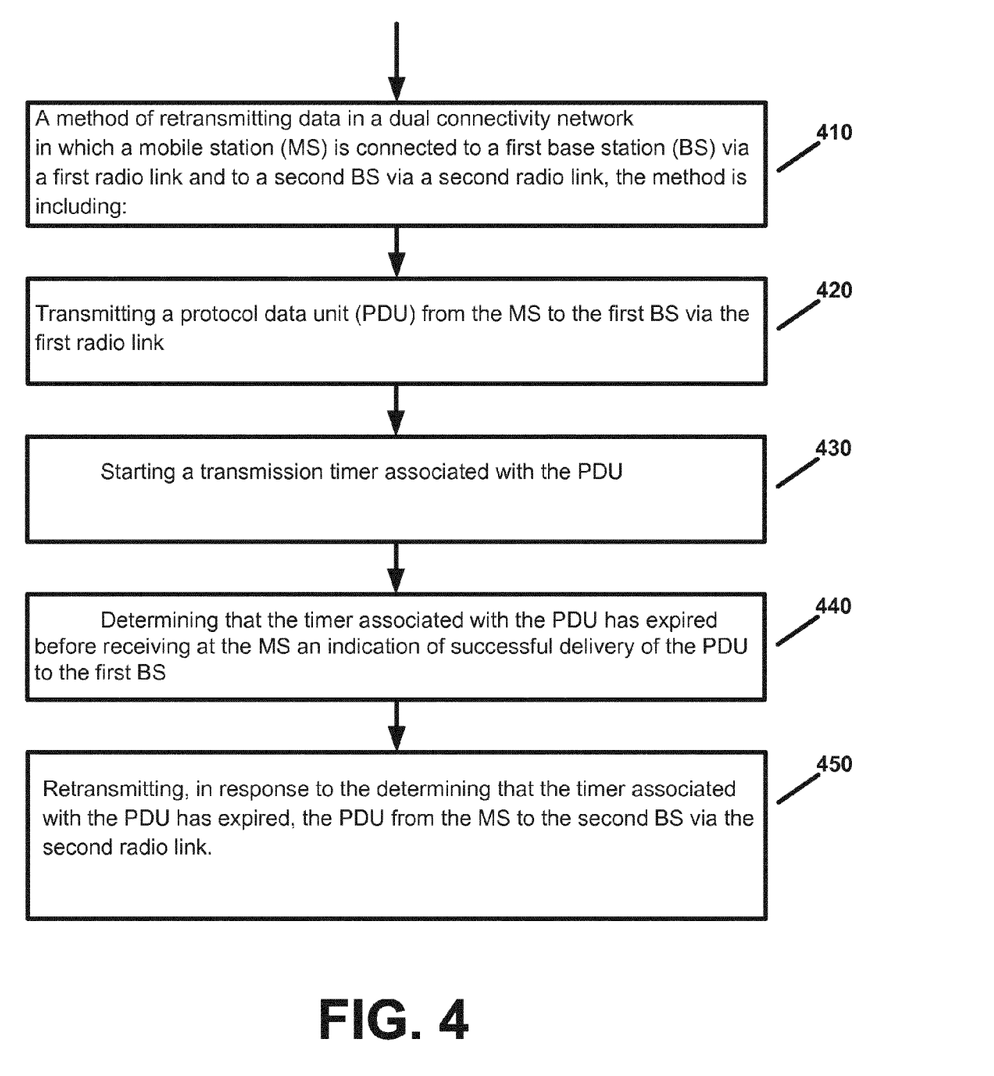
FIG. 4 is a flow chart illustrating operation of a mobile station according to another example implementation.

FIG. 4 is a flow chart illustrating operation of a mobile station according to another example implementation. At 410, a method is provided of retransmitting data in a dual connectivity network in which a mobile station (MS) is connected to a first base station (BS) via a first radio link and to a second BS via a second radio link. The method includes: Operation 420 includes transmitting a protocol data unit (PDU) from the MS to the first BS via the first radio link. Operation 430 includes starting a transmission timer associated with the PDU. Operation 440 includes determining that the timer associated with the PDU has expired before receiving at the MS an indication of successful delivery of the PDU to the first BS. Operation 450 includes retransmitting, in response to the determining that the timer associated with the PDU has expired, the PDU from the MS to the second BS via the second radio link.

Figure 5:
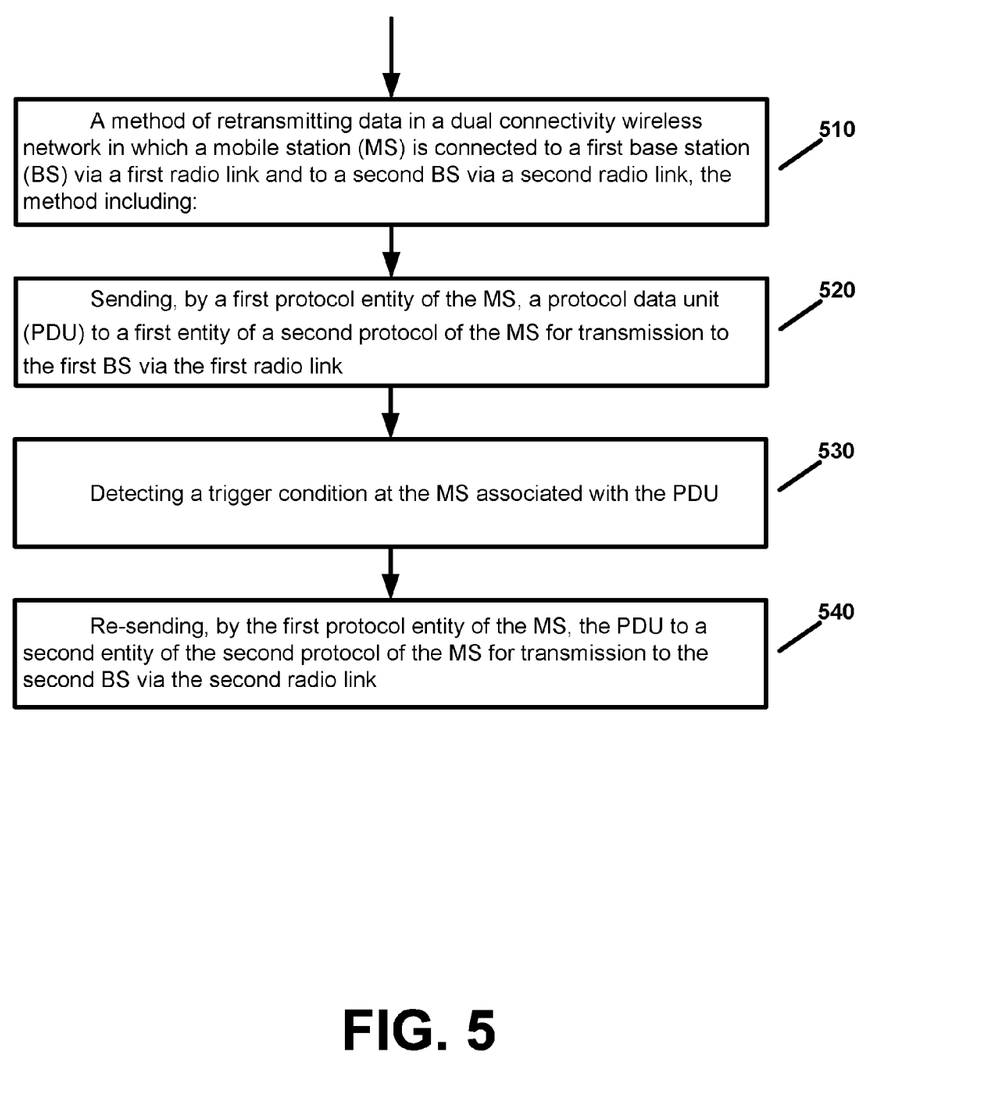
FIG. 5 is a flow chart illustrating operation of a mobile station according to another example implementation.

FIG. 5 is a flow chart illustrating operation of a mobile station according to another example implementation. At 510, a method is provided of retransmitting data in a dual connectivity network in which a mobile station (MS) is connected to a first base station (BS) via a first radio link and to a second BS via a second radio link. The method includes: Operation 520 includes sending, by a first protocol entity of the MS, a protocol data unit (PDU) to a first entity of a second protocol of the MS for transmission to the first BS via the first radio link. Operation 530 includes detecting a trigger condition at the MS associated with the PDU. And, operation 540 includes re-sending, by the first protocol entity of the MS, the PDU to a second entity of the second protocol of the MS for transmission to the second BS via the second radio link.

Figure 6:
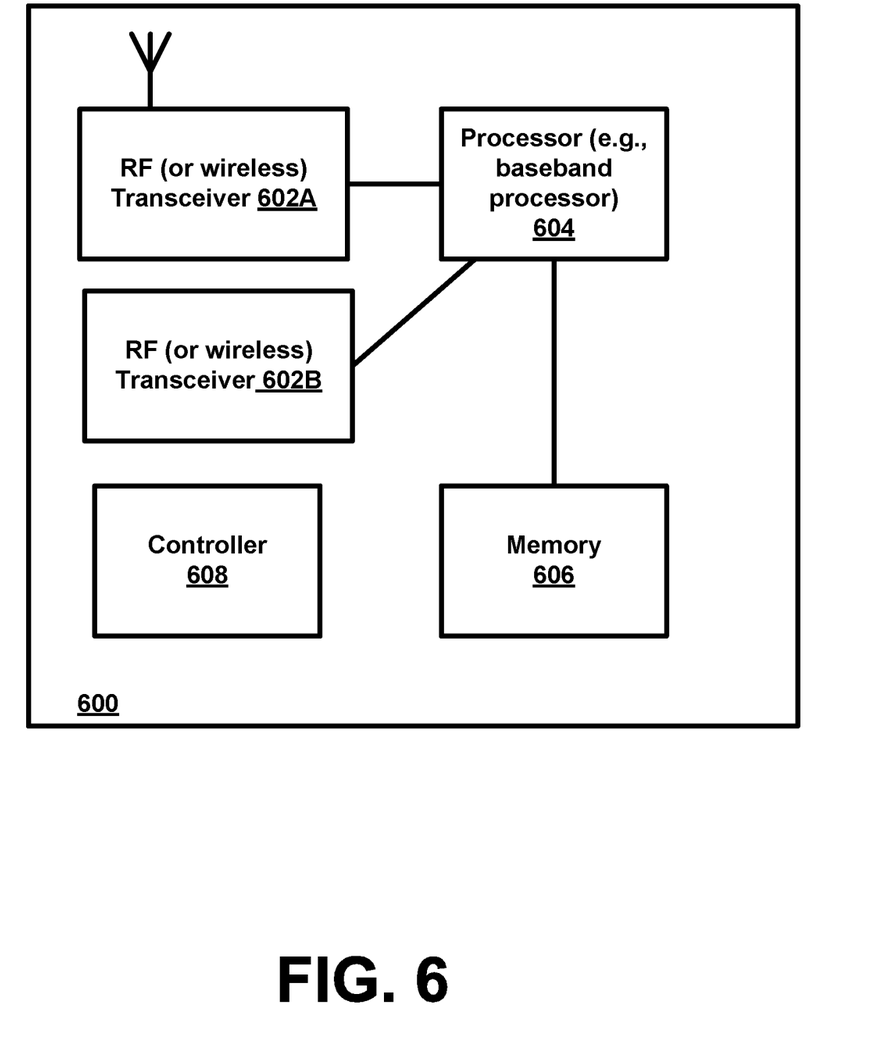
FIG. 6 is a block diagram of a wireless station (e.g., BS or MS) 600 according to an example implementation.

FIG. 6 is a block diagram of a wireless station (e.g., BS or MS) 600 according to an example implementation. The wireless station 600 may include, for example, two RF (radio frequency) or wireless transceivers 602A, 602B, where each wireless transceiver includes a transmitter to transmit signals and a receiver to receive signals. The wireless station also includes a processor 604 to execute instructions or software and control transmission and receptions of signals, and a memory 606 to store data and/or instructions.

Processor 604 may also make decisions or determinations, generate frames, packets or messages for transmission, decode received frames or messages for further processing, and other tasks or functions described herein. Processor 604, which may be a baseband processor, for example, may generate messages, packets, frames or other signals for transmission via wireless transceiver 602. Processor 604 may control transmission of signals or messages over a wireless network, and may receive signals or messages, etc., via a wireless network (e.g., after being down-converted by wireless transceiver 602, for example). Processor 604 may be programmable and capable of executing software or other instructions stored in memory or on other computer media to perform the various tasks and functions described above, such as one or more of the tasks or methods described above. Processor 604 may be (or may include), for example, hardware, programmable logic, a programmable processor that executes software or firmware, and/or any combination of these. Using other terminology, processor 604 and transceiver 602 together may be considered as a wireless transmitter/receiver system, for example.

In addition, referring to FIG. 6, a controller (or processor) 608 may execute software and instructions, and may provide overall control for the station 600, and may provide control for other systems not shown in FIG. 6, such as controlling input/output devices (e.g., display, keypad), and/or may execute software for one or more applications that may be provided on wireless station 600, such as, for example, an email program, audio/video applications, a word processor, a Voice over IP application, or other application or software.

In addition, a storage medium may be provided that includes stored instructions, which when executed by a controller or processor may result in the processor 604, or other controller or processor, performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method of transmitting data in a dual connectivity wireless network in which a mobile station (MS) is connected to a first base station (BS) via a first radio link and to a second BS via a second radio link, the method comprising:
   sending, by a first protocol entity of the MS, a protocol data unit (PDU) to a first entity of a second protocol of the MS for transmission to the first BS via the first radio link;
   detecting a trigger condition at the MS associated with the PDU; and
   re-sending, by the first protocol entity of the MS, the PDU to a second entity of the second protocol of the MS for transmission to the second BS via the second radio link.

2. The method of claim 1 wherein the first protocol entity comprises a Packet Data Convergence Protocol (PDCP) entity at the MS; and
   wherein the first entity of the second protocol comprises a first Radio Link Control (RLC) entity at the MS, and the second entity of the second protocol comprises a second RLC entity at the MS.

3. The method of claim 1 wherein the first protocol entity is a higher layer protocol entity than the first entity of the second protocol and the second entity of the second protocol.

4. The method of claim 1 wherein the detecting a trigger condition comprises:
   starting a transmission timer associated with the PDU;
   determining that the timer associated with the PDU has expired before the first protocol entity receives an indication of successful delivery of the PDU to the first BS.

5. The method of claim 4 wherein the starting a transmission timer comprises starting a transmission timer associated with the PDU when the first protocol entity sends the PDU to the first entity of the second protocol.

6. The method of claim 4 wherein the starting a transmission timer comprises starting a transmission timer associated with the first entity of the second protocol transmits the PDU to the first BS via the first radio link.

7. The method of claim 1 wherein the detecting a trigger condition comprises receiving, by the first protocol entity of the MS from the first entity of the second protocol of the MS, an indication that a maximum number of attempts to transmit at least portion of the PDU has failed.

8. The method of claim 1:
   wherein the detecting a trigger condition comprises:
      starting a transmission timer associated with the PDU;
      determining that the timer associated with the PDU has expired before the first protocol entity receives an indication of successful delivery of the PDU to the first B S;
   wherein the sending comprises sending, by a Packet Data Convergence Protocol (PDCP) entity of the MS, a protocol data unit (PDU) to a first Radio Link Control (RLC) entity of the MS for transmission to the first BS via the first radio link; and
   wherein the re-sending comprises re-sending, by the PDCP entity of the MS in response to the determining that the timer associated with the PDU has expired, the PDU to a second RLC entity of the MS for transmission to the second BS via the second radio link.

9. The method of claim 8 wherein the first RLC entity of the MS is coupled to a first peer RLC entity at the first BS via the first radio link, and the second RLC entity of the MS is coupled to a second peer RLC entity at the second BS via the second radio link.

10. The method of claim 8 wherein the first RLC entity of the MS is coupled to a first peer RLC entity at the first BS via the first radio link, and wherein the first RLC entity of the MS provides an indication of successful PDU delivery to the PDCP entity of the MS for each PDU transmitted from the first RLC entity of the MS to the first peer RLC entity of the BS which is acknowledged to the first RLC entity as being received by the first peer RLC entity of the first BS.

11. The method of claim 8 wherein the second RLC entity of the MS is coupled to a second peer RLC entity at the second BS via the second radio link, and wherein the second RLC entity of the MS provides an indication of successful PDU delivery to the PDCP entity of the MS for each PDU transmitted from the second RLC entity of the MS to the second peer RLC entity of the BS which is acknowledged to the second RLC entity as being received by the second peer RLC entity of the second BS.

12. The method of claim 8 and further comprising resetting and restarting the timer associated with the PDU upon the re-sending of the PDU to the second RLC entity of the MS.

13. The method of claim 8 and further comprising not restarting the timer upon the re-sending of the PDU to the second RLC entity of the MS.

14. An apparatus provided in a dual connectivity wireless network in which a mobile station (MS) is connected to a first base station (BS) via a first radio link and to a second BS via a second radio link, the apparatus comprising at least one processor and at least one memory including computer instructions, when executed by the at least one processor, cause the apparatus to:
   send, by a first protocol entity of the MS, a protocol data unit (PDU) to a first entity of a second protocol of the MS for transmission to the first BS via the first radio link;
   detect a trigger condition at the MS associated with the PDU; and
   re-send, by the first protocol entity of the MS, the PDU to a second entity of the second protocol of the MS for transmission to the second BS via the second radio link.

15. A method of retransmitting data in a dual connectivity network in which a mobile station (MS) is connected to a first base station (BS) via a first radio link and to a second BS via a second radio link, the method comprising:
   transmitting a protocol data unit (PDU) from the MS to the first BS via the first radio link;
   starting a transmission timer associated with the PDU;
   determining that the timer associated with the PDU has expired before receiving at the MS an indication of successful delivery of the PDU to the first BS; and
   retransmitting, in response to the determining that the timer associated with the PDU has expired, the PDU from the MS to the second BS via the second radio link.

16. The method of claim 15 wherein the transmitting comprises:
   sending, by a Packet Data Convergence Protocol (PDCP) entity of the MS, the PDU to a first Radio Link Control (RLC) entity of the MS; and
   transmitting the PDU from the first RLC entity of the MS to a first peer RLC entity of the first BS via the first radio link.

17. The method of claim 16 wherein the receiving at the MS an indication of a successful delivery of the PDU to the first BS comprises:
   receiving, by the first RLC entity of the MS, an acknowledgement from the first peer RLC entity of the first BS that acknowledges that the PDU was received by the first peer RLC entity of the first BS; and the PDCP entity of the MS receiving an indication of a successful delivery of the PDU from the first RLC entity of the MS.

18. The method of claim 15 wherein the retransmitting comprises:

sending, by a Packet Data Convergence Protocol (PDCP) entity of the MS, the PDU to a second Radio Link Control (RLC) entity of the MS; and transmitting the PDU from the second RLC entity of the MS to a second peer RLC entity of the second BS via the second radio link.

19. An apparatus provided in a dual connectivity wireless network in which a mobile station (MS) is connected to a first base station (BS) via a first radio link and to a second BS via a second radio link, the apparatus comprising at least one processor and at least one memory including computer instructions, when executed by the at least one processor, cause the apparatus to:

transmit a protocol data unit (PDU) from the MS to the first BS via the first radio link;

start a transmission timer associated with the PDU; and determine that the timer associated with the PDU has expired before receiving at the MS an indication of successful delivery of the PDU to the first BS; and retransmit, in response to the determining that the timer associated with the PDU has expired, the PDU from the MS to the second BS via the second radio link.

* * * * *

UNITED STATES PATENT AND TRADEMARK OFFICE
CERTIFICATE OF CORRECTION

| | | |
|---|---|---|
| PATENT NO. | : 9,706,418 B2 | Page 1 of 1 |
| APPLICATION NO. | : 14/909334 | |
| DATED | : July 11, 2017 | |
| INVENTOR(S) | : Decarreau et al. | |

It is certified that error appears in the above-identified patent and that said Letters Patent is hereby corrected as shown below:

In the Claims

In Column 17, Line 52, Claim 8, delete "B S;" and insert -- BS; --, therefor.

Signed and Sealed this
Twenty-fourth Day of October, 2017

Joseph Matal
*Performing the Functions and Duties of the
Under Secretary of Commerce for Intellectual Property and
Director of the United States Patent and Trademark Office*